May 9, 1967 R. M. MYERS 3,318,023
EDUCATIONAL DEVICE
Filed Jan. 27, 1965 2 Sheets-Sheet 1
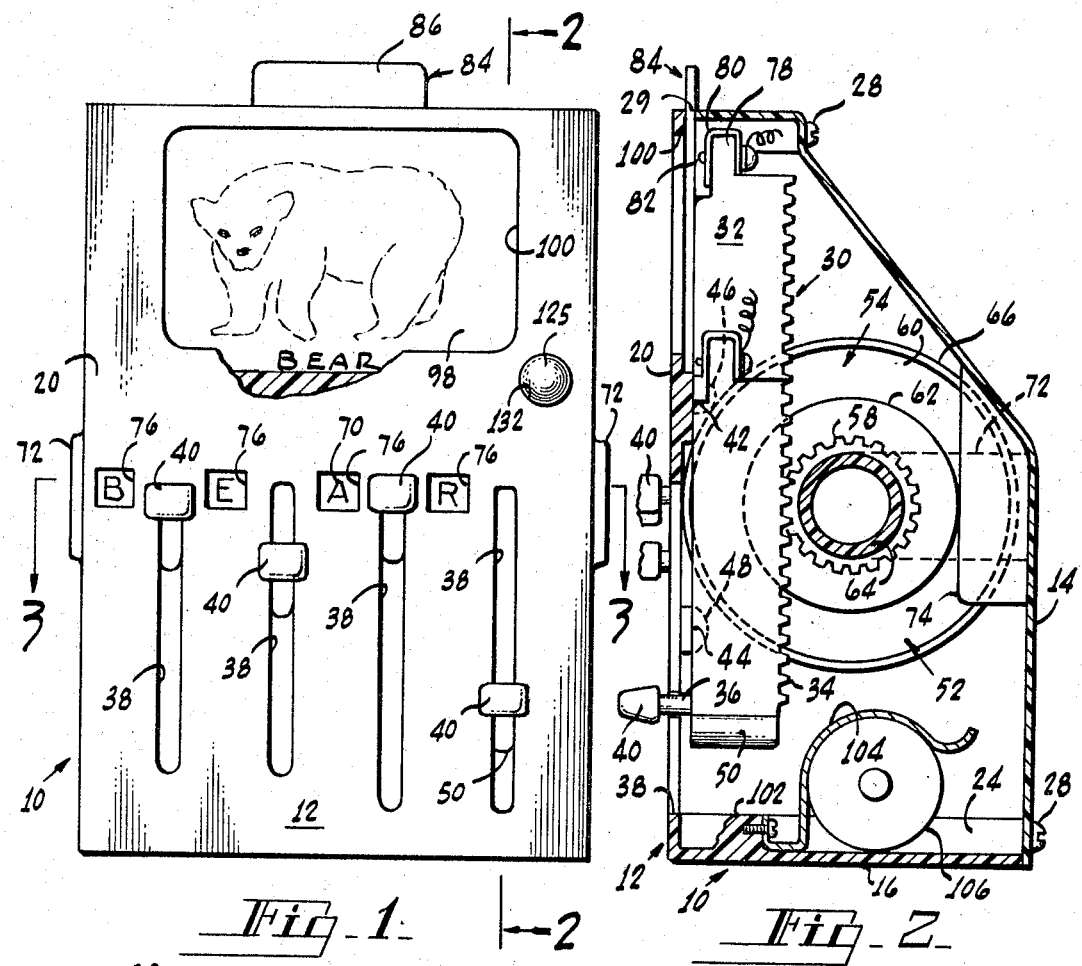
Fig. 1.
Fig. 2.
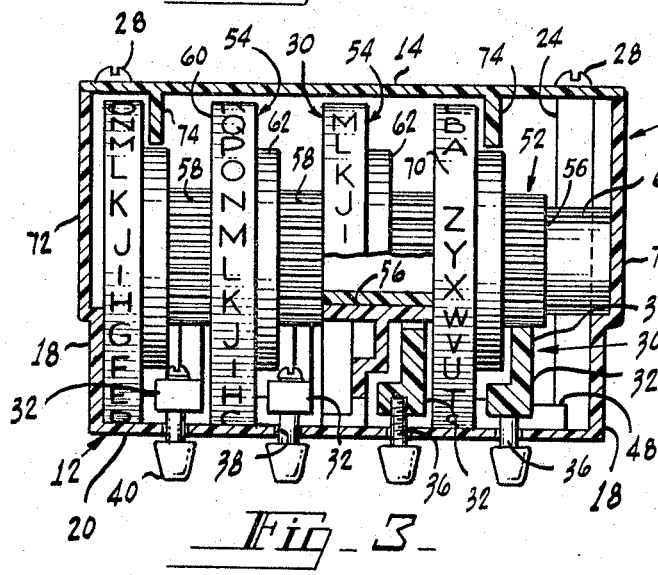
Fig. 3.
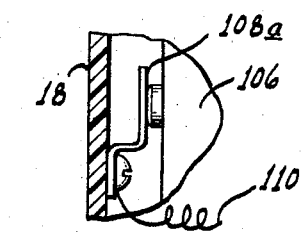
Fig. 10.
INVENTOR
RAYMOND M. MYERS
BY Albert Sperry
ATTORNEY

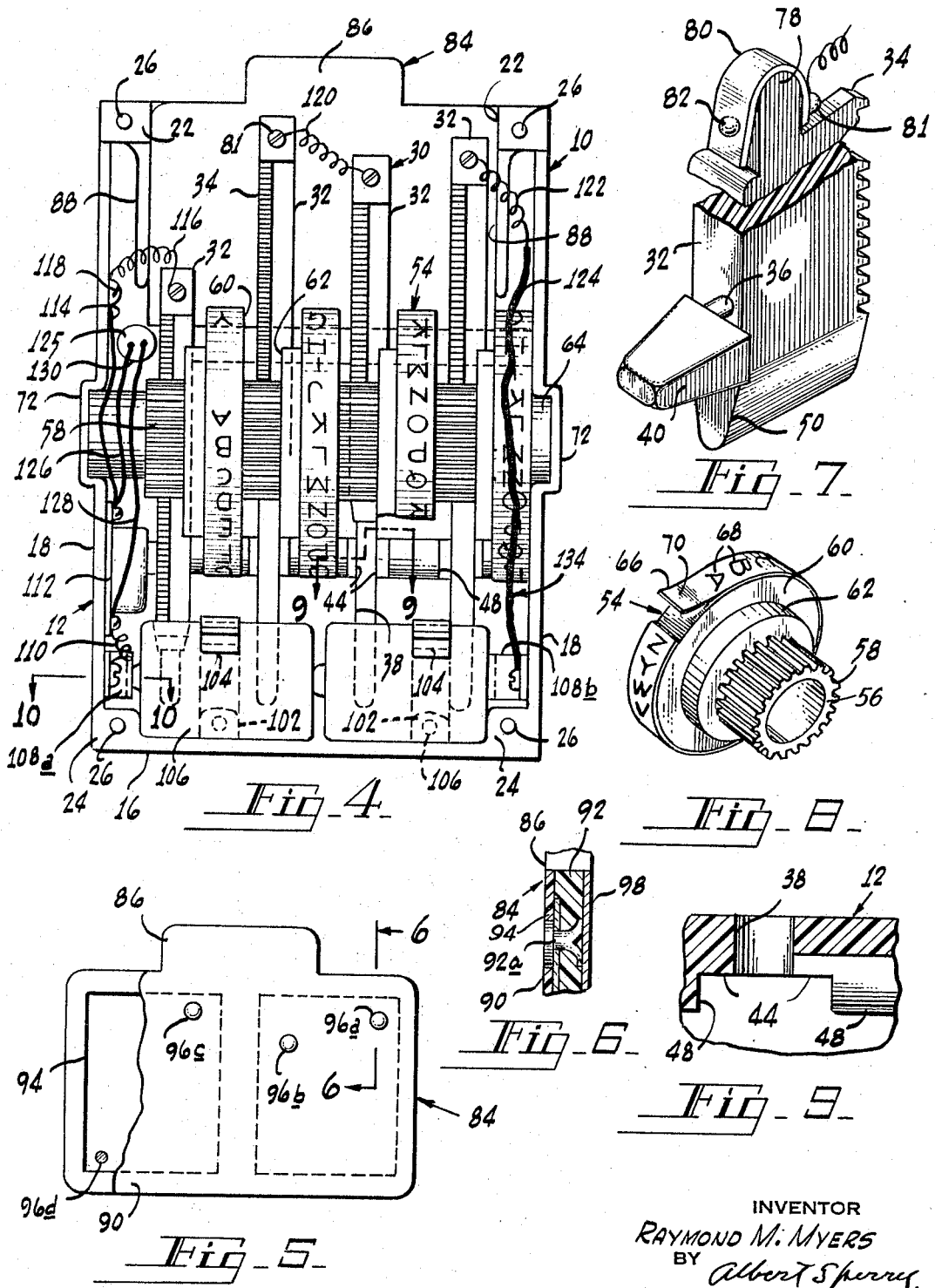

United States Patent Office 3,318,023
Patented May 9, 1967

3,318,023
EDUCATIONAL DEVICE
Raymond M. Myers, 441 Latona Ave.,
Trenton, N.J. 08618
Filed Jan. 27, 1965, Ser. No. 428,489
10 Claims. (Cl. 35—35)

This invention relates generally to educational aids or devices. More particularly, the invention has reference to a device within this generalized category that is especially suited for—but is not necessarily restricted to— teaching young children how to spell a large variety of simple, basic words.

The present invention, it may be noted at this point, is in the nature of an improvement over my educational aid previously patented (Patent No. 2,200,206, issued May 7, 1940) and having the same basic purpose as the present construction.

The basic desirability of a device of this nature need not be discussed extensively herein. It is already well known that small children can advantageously be taught spelling with maximum interest and enjoyment so far as they themselves are concerned, through the medium of equipment whereby spelling is taught by association of objects with words, with the child being given added interest-producing impetus in the spelling lesson by reason of the fact that he himself operates the machine to produce the correct answer.

It is believed sufficient for the purposes of the present application to point out that where a child can be taught spelling by viewing a picture, then operating handles or levers to select the correct letters in correct order to spell the word which the picture connotes, the pupil's interest will be definitely quickened and his learning will accordingly progress at a rapid pace.

With this in mind, it may be considered that since my previously patented educational device already produces desirable results as outlined above, the main object of the present invention is to distinctly simplify the construction of a device of this nature through the medium of a novel formation and relationship of parts, capable of individual manufacture and of subsequent assembly, at comparatively low cost.

Another object of importance is to provide a device of the character stated that will be highly reliable in operation, and will be possessed of a high degree of durability, despite its relatively low cost and simplified construction.

Still another object is to provide a device for teaching spelling, which will be adapted, though of simplified design, to spell any words from two or four letters in length. In this way, it is proposed to permit the small child to progress from the simplest, shortest words on up to a large number of more difficult words. Thus, the small child is provided with a good groundwork in spelling, to ready him for movement on to more advanced techniques relating to the teaching not only of spelling, but of reading and other related subjects.

Summarized briefly, the present invention comprises a housing of compact size and form, having a main viewing opening through which one may see the delineation of an object the name of which the child is to spell. Below the main viewing opening or window, there is a row of smaller windows, behind which drums are rotatable independently of one another. Each drum carries on its periphery the letters of the alphabet, so that when the drums are in correct, relative positions of angular adjustment about their common axis, the desired word will appear in the smaller viewing openings.

The drums are individually rotated by racks, movable upwardly and downwardly under the control of the user. The drums are formed with gear teeth meshing with the teeth of the racks, so that when the child moves the racks to particular, selected positions, the drums will turn to locate the desired letters for viewing through the small sight openings.

Enclosed in the housing is a normally open electrical signal circuit. In accordance with the invention, the racks carry contacts adapted to move into engagement with terminals provided upon the back surface of the picture card seen through the main viewing opening, if the racks are in correct positions of vertical adjustment effective to cause the correctly spelled word to appear in the small viewing openings. The picture card carries spaced jumper strips, which are adapted to bridge the normally open circuit when the racks are correctly located, thus to energize an electrical signal or combination of signals to signify to the child that the word has been correctly spelled.

Other objects will appear from the following description, the claims appended thereto, and from the annexed drawing, in which like reference characters designate like parts throughout the several views, and wherein:

FIG. 1 is a front elevational view of an educational device formed in accordance with the present invention;

FIG. 2 is a vertical, longitudinal sectional view therethrough taken substantially on line 2—2 of FIG. 1;

FIG. 3 is a horizontal, transverse sectional view substantially on line 3—3 of FIG. 1;

FIG. 4 is a rear elevational view of the device with the back plate removed;

FIG. 5 is a back view of one of the picture cards, a portion being broken away;

FIG. 6 is an enlarged, detailed sectional view through the picture card substantially on line 6—6 of FIG. 5;

FIG. 7 is an enlarged perspective view, a portion being broken away, of one of the racks;

FIG. 8 is a perspective view of one of the drums, an indicia-bearing tape being partially removed;

FIG. 9 is an enlarged, detail sectional view substantially on line 9—9 of FIG. 4, showing the guide means for the racks; and FIG. 10 is a detail sectional view substantially on line 10—10 of FIG. 4.

Referring to the drawing in detail, a support or housing generally designated 10 is of two-piece construction in the illustrated, prefered embodiment of the invention, and includes a body generally designated 12, and a back plate or cover 14.

Preferably, the body and back plate are of a compression-molded plastic, but it will be understood that the use of this material is not critical to the invention. It is mainly important that the material used be durable and capable of manufacture at relative low cost.

In any event, in the illustrated example the body 12 includes a flat bottom wall 16, integral with upstanding side walls 18 and front wall 20. The body opens rearwardly, and as shown in FIG. 4, is molded integrally at its upper and lower corners with solid corner portions 22, 24 respectively, having tapped recesses 26 adapted to receive assembly screws 28 extending through clearance openings provided in the upper and lower corners of the back plate 14.

In the illustrated example, the back wall inclines forwardly upwardly from a location substantially midway between its upper and lower ends, to the upper end thereof. At its upper end, the back plate has a horizontal portion terminating short of the upper edge of the front wall 20 to define therebetween an entrance slot 29 (FIG. 2).

The invention includes a rack assembly generally designated 30, comprising a plurality of racks 32 mounted in the housing to slide on the front wall 20 in vertical paths. The racks in the present instance, but not necessarily, are four in number, and are of identical formation, being formed with elongated, generally flat bodies of plastic material or the like.

The racks 32 can alternatively be termed answer selection or drive members, since they are manually shifted, independently of one another, along their vertical paths for the purpose of selection of answer indicia provided upon rotatable driven members.

As shown to particular advantage in FIGS. 2, 3, and 7, each rack is provided with a rearwardly projecting, flat rib 34 of reduced width, having, over substantially the full length of the rack, reawardly facing rack teeth.

Fixedly secured to and projecting from the lower end portion of each rack is a stud 36, which can be threaded into a tapped hole of the rack as shown in FIG. 3, or alternatively, can be embedded in the rack at the time the same is molded. In any event, the studs 36 project through elongated, relatively narrow, vertically extending guide slots 38 (FIG. 1), and exteriorly of the housing, handles for operating knobs 40 are secured to the studs for convenience in shifting the racks upwardly and downwardly in their vertical paths. The ends of the slots limit the upward and downward movement of the racks.

As shown in FIG. 2, the racks, in the preferred embodiment of the invention, are spaced rearwardly from the front wall 20 a short distance, to permit insertion of a picture card between the front wall and the series of racks. To this end, I provide upper and lower raised portions 42, 44 respectively upon the back surface of the front wall (see FIGS. 2, 4, and 9). The raised portions are disposed at opposite sides of each slot 38, and the front surfaces of the racks are in slidable contact therewith.

To hold the racks against lateral deviation during their slidable movement, I provide, at the level of the raised portions 42, 44, upper and lower guide bosses 46, 48 respectively, which like the portions 42, 44, are molded integrally with the body 12 as component portions thereof. The bosses are disposed in engagement with the opposite side surfaces of the racks, at locations spaced longitudinally of the racks, to assure the retention of each rack in its assigned, vertical path during the up-and-down movement thereof.

At their lower ends, the racks are molded integrally with downwardly tapering extensions 50. The purpose of the extensions 50 is to assure that the racks will not hang up on the lower guide bosses 48 when they move downwardly therebetween, but will instead be guided between said bosses due to the tapering formation of the extensions 50.

Cooperating with the rack assembly, in the selection of the proper indicia, is a drum assembly generally designated 52. This comprises a plurality of side-by-side driven members or drums 54, identical to one another and mounted for rotation about a common axis, independently of one another in response to up-and-down movement of their respective, associated racks.

The drums 54, in the illustrated embodiment of the invention, are each formed with a bearing sleeve 56, the outer surface of which is molded at one end thereof with gear teeth to provide a pinion 58 as a component part of each drum. In juxtaposition to the pinion 58, each drum is provided with a large diameter, flanged base 60, having a shoulder portion 62 (FIG. 8), the diameter of which is greater than that of the pinion 58, but less than the main diameter of the flanged base 60.

A hollow shaft 64 is extended through the several drums 54, for the purpose of mounting the drums for individual, rotatable movement.

On the main diameter of each drum, I cement or otherwise secure a flat tape 66, on which are printed the letters of the alphabet as shown at 68. The letters can be provided on the periphery of the drum in any other suitable manner, if desired. It is important that there be provided, at one location on the periphery of the drum, a blank space 70.

Bearing recesses are provided in the opposed side walls 18, to receive the ends of the shaft 64. In the illustrated example, the side walls are molded integrally with outwardly offset portions 72, which extend fully from the back edges of the side walls to a location substantially midway between the back and front walls. The portions 72, at their front ends, are closed by front end walls curved through 180°. Accordingly, in assembling the device, the several drums can first be placed upon the shaft in side-by-side relation, after which the shaft can be inserted through the open back of the device, with the ends of the shaft entering the open rear ends of the outwardly offset portions 72. The shafts are then moved forwardly until they are engaged by the semicircularly curved front ends of the portions 72.

When the back plate 14 is applied, the shaft is retained against rearward movement from its proper position, through the medium of forwardly projecting abutments or retaining ribs 74 integrally formed upon the back plate 14. The ribs 74, as shown in FIGS. 2 and 3, extend forwardly into contact with the shouldered portions 62 of two of the drums, and this of course holds the shaft 64 against retrograde movement from its forward position. At the same time, the rib 74 shown at the right in FIG. 3 holds the several drums against movement axially of the shaft in one direction, that is, to the right in FIG. 3. Axial movement of the drums to the left in FIG. 3 is prevented by reason of the fact that the drum shown at the left hand end of the assembly in this figure is in contact with the adjacent side wall 18.

Formed in the front wall 20 is a row of horizontally spaced, relatively small, rectangular windows or viewing openings 76. The drums are so located within the housing as to cause the forward portions of the drums to be in close proximity to the respective windows or viewing openings, whereby a selected indicium will be seen through each window, said indicium being selected by movement of the appropriate handle 40 to a selected vertical position within the slot 38. Such movement shifts the rack connected to said handle, and this in turn rotates the drum in mesh with the rack that is so moved.

On the upper end of each rack, I provide electrical contacts 80. In the illustrated example, these are in the form of inverted U-shaped contact springs, one end of which is secured, by means of a binding head screw 81, to an upwardly extending, integral projection 78 of the rack. The other end of the contact is free, and normally, when the rack is not in the housing, the free end of the contact is spring-tensioned forwardly as shown in FIG. 7. On the free end portion of each contact is a raised contact surface 82.

A picture card or element 84 is removably insertable in the housing, through the upper end thereof, and includes an upwardly projecting handle 86, for convenience in inserting or removing the same. The picture card is entered through the slot 29, and when moved downwardly, is guided by elongated, vertically disposed guide ribs 88 integrally formed upon the front wall 20 at opposite ends of the entrance slot 29. Downward movement of the picture card is limited by the upper raised portions 42.

When the picture card is inserted, it engages the raised contact surfaces 82. The movement of the picture card into the housing, to its FIG. 2 position, causes the free ends of the spring contacts 80 to be pressed inwardly as shown in FIG. 2.

In this way, effective electrical contact is maintained between the several contacts 80 and an electrical jumper means provided upon each picture card. Each picture card, in this connection, is of laminated formation (FIGS. 5 and 6), including outer laminations 90, 92 formed of an electrically insulative material such as fiberboard. Sandwiched between the laminations 90, 92 are horizontally spaced, rectangular jumper strips 94. In a preferred embodiment, these comprise thin pieces of metal foil, each piece of foil being of a width sufficient to extend between two adjacent racks 32.

Extending through each jumper strip is a pair of electrical contacts, providing, in effect, terminations for each jumper strip. Thus, in the illustrated embodiment I use rivets 96a, 96b, 96c, 96d. Rivets 96a, 96b extend through one jumper strip 94, while rivets 96c, 96d extend through the other jumper strip.

The rivets extended through each jumper strip are disposed in the paths of the racks immediately adjacent the strip. In the illustrated example, wherein the educational device is used for spelling of words no more than four letters in length, I provide two pairs of racks, with the racks of each pair being associated with a jumper strip 94. Thus, the up-and-down movement of the racks of each pair is effective to bring the contact surfaces 82 thereof into engagement with the rivets 96a, 96b, 96c, or 96d as the case may be. This engagement between the contact surfaces 82 and their associated rivets, however, is achieved only at one particular point of vertical adjustment of the associated rack.

On the front surface of each picture I provide the delineation of an object, the name of which is to be spelled. In the illustrated example, I do this by glueing a picture 98 to the front surface of the lamination 92, said picture being visible through a main window or viewing opening 100 formed in the front wall between the guide ribs 88.

In the illustrated example, the card carries on it the picture of a bear, so that the child is required to spell the word "bear" by moving the several racks to vertical positions such as to cause the letters B, E, A, and R to be visible through the windows 76. In these positions, the contact surfaces 82 will be in engagement with the rivets that extend through the jumper strips 94 of this particular card. If the child selects even one letter incorrectly, of course, at least one contact surface 82 will be out of registration with the rivet lying in its path.

An electrical signaling circuit is carried at least in part by the several racks, and is completed through the jumper strips 94. To this end, I provide integrally molded ribs 102, projecting rearwardly from the front wall, at the bottom of the housing (FIG. 2), and having tapped openings in their rearwardly facing ends. Spring clips 104 are secured to said ribs, by means of screws extended through the spring clips into the ribs. Conventional flashlight batteries 106 are engaged against the bottom of the housing by means of the clips, in end-to-end arrangement, with the positive terminal of one battery being engaged against a spring terminal 108a secured to one side wall 18 (FIG. 4). The negative terminal of the other battery is engaged against a similar terminal 108b secured to the other side wall 18.

A lead 110 extends from the terminal 108a, to one terminal of a buzzer 112 mounted against the side wall 18 above terminal 108a. From the other terminal of the buzzer extends a lead 114, connected to a coiled lead 116 that is secured to the contact 80 of one of the racks.

A suitable means is provided for anchoring the leads 114, 116 where they are connected to the side wall 18. For example, a drop of cement 118 can be applied at this point.

A connecting lead or jumper 120 is extended between the contacts 80 of the racks disposed at the center of the rack assembly, that is, the racks whose contacts 80 are engageable by the rivets 96b, 96c. A lead 122 extends from the contact 80 of the remaining rack to one end of a lead 124, extending to the negative terminal 108b.

A pilot light 125 is connected in parallel with the buzzer 112, through the medium of leads 126, 128 extending from the terminals of the pilot light to the opposite terminals of the buzzer. The pilot light can be engaged in a clip 130 extending laterally from the adjacent side wall 18, and is projected forwardly through an opening 132 formed in front 20.

This provides an electrical signaling circuit 134, which in the illustrated example is normally open but which is closed whenever a circuit is completed through the jumper strips 94.

In use, there would be a substantial number of picture cards, each bearing a different representation the name of which is to be spelled. However, each picture card would be made with similar laminations 90, 92, and jumper strips 94. This would simplify the manufacture of the several picture cards required. It is necessary merely to locate the rivets 96a, 96b, 96c, and 96d at different points on the card along the paths of the racks associated therewith. In the illustrated example, the rivets are so located that when the user moves the several racks to positions wherein the word "bear" is correctly spelled, the several rivets will be in engagement with the contacts 80 of the several racks. The result will be that a circuit will be closed, being completed through both jumper strips and through the connection provided between the two jumper strips by the connecting lead 120. If any letter of the word is incorrectly selected, the circuit will remain open, since one rivet (or more than one, if more than one letter is incorrectly selected) will be out of engagement with its associated contact 80.

The rivet location will change for every picture card, as will be readily understood, according to where the contact surfaces 82 are disposed when the word associated with the picture card is correctly spelled.

Words smaller than four letters can also be spelled using the device. For example, a three letter word can be readily spelled, and the electrical signalling circuit will be closed if the child locates, in the last window 76, the blank space 70 of the drum visible through said last window. When the blank space is seen through the last window, the contact of the associated rack will be disposed to close the circuit.

A two letter word can also be spelled, of course, in the same manner.

As shown in FIGURE 1, the first two slots 38 are slightly shorter than the remaining slots. The purpose of this arrangement is to prevent the child from bringing blank spaces into registry with the first two windows. This insures that he will spell two-and-three-letter words only in the first two and three windows, respectively.

It will be readily perceived that the construction as illustrated and described has desirable characteristics, with respect to durability, reliability, and simplification of manufacture. A device of this nature, of course, has considerable possibilities as a teaching aid, in that it is calculated to keep the child's interest at a high level. It is axiomatic that a child whose interest is kept at a high level will learn more rapidly and more thoroughly.

The child's interest is particularly maintained by reason of the fact that the child himself operates the device, to spell the word. A child has great interest and enjoyment in operating the various handles 40, to locate the racks in positions such as to spell a particular word. Further, there is a reward, when the word is correctly spelled, in the sounding of the buzzer and the illumination of the pilot light. Various other signals can of course be used, to heighten interest in the device should the manufacturer so desire.

Although the illustrated example is of a device that allows the spelling of two-, three-, and four-letter words, it could be made in larger sizes, to permit the spelling of words longer than four letters.

It will be noted that each picture bears a legend in the form of the correctly spelled word that it represents. This is of course concealed below opening 100 in the inserted position of the picture card. The legend is desirable, in that it teaches the child the spelling of the word, by association with the picture. Thus, when the cards are out of the device, they are usable by one who is teaching the child the spelling of various words.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any changes in construction that may be permitted within the scope of the appended claims.

I claim:

1. An educational device comprising:
   (a) a support;
   (b) at least two pairs of answer selection members individually movable thereon to selected positions under the control of a user, each member including an electrical contact, one member of each pair having a continuous electrical connection to one member of the other pair;
   (c) an element removably positioned on the support, and bearing a representation to be identified by arranging each answer selection member in a correctly selected position in respect to the several remaining members, said element including a pair of jumper strips, one for each pair of members, each strip providing a bridge between the contacts of its associated, paired members when their positions have been correctly selected; and
   (d) an electrical signal circuit carried at least in part by said members, said circuit including said contacts so as to be operated through the jumpers in said correctly selected positions of the answer selection members.

2. An educational device as in claim 1 wherein said members are of elongated form and have rectilinear movement to their selected positions in the direction of their lengths, said jumper strips respectively extending between the paths in which their associated, paired members move and having terminations in said paths engageable by the contacts of the members.

3. An educational device as in claim 2 wherein said jumper strips are of thin, flat form, the terminations for each strip comprising headed fasteners extended through the strip at predetermined, relative locations occurring along said paths.

4. An educational device as in claim 2 wherein said element is of flat form, comprising a pair of laminae of electrically insulative material between which said strips are confined, the terminations for each strip comprising electrically conductive fasteners extending through said laminae in electrical contact with the strip and exposed at the outside of the element in the paths in which their associated members and contacts move.

5. An educational device comprising:
   (a) a support;
   (b) elongated drive member individually movable thereon in the direction of their lengths along straight paths under the control of a user;
   (c) driven members, each having a series of indicia depicted thereon, individually rotatably mounted on the support and rotating in response to said movement of the drive members, thus to be moved to selected positions of angular adjustment according to selected positioning of their respective, associated drive members;
   (d) an element removably positioned on the support, and bearing the representation of an object to be identified by arranging correctly selected indicia of the respective driven members in a correct order, said element including electrically conductive jumper means; and
   (e) a normally open electrical signal circuit carried at least in part by the respective drive members, said circuit being closed through the jumper means when correct indicia of the driven members have been arranged in a correct order by movement of the drive members to correctly selected positions.

6. An educational device comprising:
   (a) a support;
   (b) elongated drive members individually movable thereon in the direction of their lengths along straight paths under the control of a user;
   (c) driven members, each having a series of indicia depicted thereon, individually rotatably mounted on the support and rotating in response to said movement of the drive members, thus to be moved to selected positions of angular adjustment according to selected positioning of their respective, associated drive members;
   (d) an element removably positioned on the support, and bearing the representation of an object to be identified by arranging correctly selected indicia of the respective driven members in a correct order through the medium of correctly angularly adjusting the driven members relative to one another, said element including at least one electrically conductive jumper strip extended between the paths in which said members move and provided with electrical terminations lying in said paths; and
   (e) a normally open electrical signal circuit carried at least in part by the respective drive members, said circuit being closed through the jumper strip when correct indicia of the driven members are arranged in correct order by movement of the drive members to correctly selected positions.

7. An educational device as in claim 6 wherein each of said drive members includes a series of rack teeth, said driven members including pinions in mesh with the teeth of their associated drive members.

8. An educational device as in claim 6 wherein said support comprises a housing having a main viewing opening through which the representation on said element can be seen, said housing having a row of secondary viewing openings through which the indicia of the several drive members may be viewed.

9. An educational device comprising:
   (a) a housing having a main viewing opening and a row of secondary viewing openings;
   (b) at least two pairs of answer selection members in the form of elongated, parallel racks mounted in the housing for rectilinear reciprocating movement in the direction of their lengths under the control of a user, each rack including an electrical contact, one rack of each pair having a continuous electrical connection between its contact and the contact of one rack of the other pair;
   (c) at least four drums mounted in the housing for rotation independently of one another, each drum having a series of indicia viewable through an associated secondary viewing opening, each drum including a pinion in mesh with an associated, adjacent rack, thus to selectively, angularly adjust the drums so as to arrange selected indicia thereof in a selected order for viewing, responsive to correspondingly selective positioning of the several racks;
   (d) an element removably, slidably insertable in the housing, said element bearing a pictorial representation visible through the main viewing opening and identifiable by arranging each rack in a correctly selected position in respect to the remaining racks, said element including a pair of jumper strips, one for each pair of racks, each strip providing a bridge between the contacts of its associated, paired racks when the positions of the racks have been correctly selected; and (e) an electrical signal circuit carried at least in part by said racks, said circuit including said contacts so as to be operated through the jumper strips in said correctly selected positions of the racks.

10. An educational device as in claim 9 wherein said circuit includes battery means, an electrical signal device connected in series between one post of said means and the contact of the other rack of one of said pairs of racks, and an electrical connection extending between the contact of the other rack of the other pair of racks and the other post of the battery means.

References Cited by the Examiner
UNITED STATES PATENTS

| | | | |
|---|---|---|---|
| 2,200,206 | 5/1940 | Myers | 350—9 |
| 2,499,323 | 2/1950 | McCash | 35—35.7 |
| 2,586,564 | 2/1952 | Rinde | 35—9 |
| 3,146,534 | 9/1964 | Brown et al. | 35—9 X |

EUGENE R. CAPOZIO, *Primary Examiner.*

W. GRIEB, *Assistant Examiner.*